(12) United States Patent
Cantwell

(10) Patent No.: US 11,312,577 B2
(45) Date of Patent: *Apr. 26, 2022

(54) CONVEYOR SYSTEM

(71) Applicant: KROMEK LIMITED, Sedgefield (GB)

(72) Inventor: Benjamin John Cantwell, Sedgefield (GB)

(73) Assignee: KROMEK LIMITED, Sedgefield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/982,699

(22) PCT Filed: Apr. 4, 2019

(86) PCT No.: PCT/GB2019/050963
§ 371 (c)(1),
(2) Date: Sep. 21, 2020

(87) PCT Pub. No.: WO2019/193335
PCT Pub. Date: Oct. 10, 2019

(65) Prior Publication Data
US 2021/0002077 A1 Jan. 7, 2021

(30) Foreign Application Priority Data
Apr. 5, 2018 (GB) .................................... 1805669

(51) Int. Cl.
*B65G 17/34* (2006.01)
*G01N 23/10* (2018.01)

(52) U.S. Cl.
CPC ............. *B65G 17/34* (2013.01); *G01N 23/10* (2013.01); *B65G 2203/04* (2013.01); *G01N 2223/639* (2013.01)

(58) Field of Classification Search
CPC ................ B65G 17/34; B65G 2203/04; B65G 2201/0244; B65G 17/46;
(Continued)

(56) References Cited

U.S. PATENT DOCUMENTS 6,065,587 A * 5/2000 Schindel ............ B65G 47/1457
198/392
7,131,523 B2 * 11/2006 Brixius ................ B65G 17/002
198/465.2
(Continued)

FOREIGN PATENT DOCUMENTS

JP 2005147800 A 6/2005

OTHER PUBLICATIONS

"JP2005147800A—Description" EPO Machine Translation (Year: 2021).*
(Continued)

*Primary Examiner* — Mark A Deuble
(74) *Attorney, Agent, or Firm* — Ference & Associates LLC

(57) ABSTRACT

A conveyor system is described for use with a scanning apparatus (49) for the scanning of objects (43), such as bottles. The system comprises a transverse conveyor having a conveyor surface (45); a plurality of object support modules (41), each object support module (41) comprising a lower surface that sits upon the conveyor surface (45) of the conveyor and an upper part in which an object receiving recessed portion is defined, wherein the object receiving recessed portion defines an elongate recess having a constant transverse profile. A scanning system comprising the conveyor system in combination with an object scanner and a method of scanning embodying the principles of such a scanner are also described.

19 Claims, 4 Drawing Sheets

(58) Field of Classification Search
CPC .......... B65G 2201/0258; G01N 23/10; G01N 2223/639; G01V 5/025; B64F 1/368
USPC .......................................... 198/473.1, 867.11
See application file for complete search history.

(56) References Cited

U.S. PATENT DOCUMENTS

| | | | | |
|---|---|---|---|---|
| 7,318,519 B2* | 1/2008 | Sorensen | ................. | B65D 1/34 |
| | | | | 198/349 |
| 7,789,401 B2* | 9/2010 | Ambrefe, Jr. | ........... | G09F 23/00 |
| | | | | 280/47.34 |
| 8,009,800 B2* | 8/2011 | Doyle | .................. | G01V 5/0008 |
| | | | | 378/56 |
| 8,867,816 B2* | 10/2014 | Bouchard | ............. | G01F 23/288 |
| | | | | 382/141 |
| 9,950,828 B2* | 4/2018 | Fujio | ........................ | B65D 1/34 |
| D905,924 S* | 12/2020 | Fujio | .............................. | D34/29 |
| 10,988,315 B1* | 4/2021 | Childs | .................... | B65G 35/06 |
| 2011/0083942 A1* | 4/2011 | Tajima | .................... | B28B 13/04 |
| | | | | 198/468.01 |
| 2014/0321729 A1 | 10/2014 | Gudmundson et al. | | |
| 2015/0021342 A1 | 1/2015 | Crass et al. | | |
| 2015/0114804 A1* | 4/2015 | Delaney | .................. | B64F 1/368 |
| | | | | 198/867.01 |
| 2017/0059494 A1 | 3/2017 | Powell et al. | | |
| 2018/0162584 A1* | 6/2018 | Tauber | .................... | B62B 3/146 |

OTHER PUBLICATIONS

ISA/EP, European Patent Office, International Search Report and Written Opinion, dated Jun. 13, 2019, 11 pages, European Patent Office.

* cited by examiner

CONVEYOR SYSTEM

The present application is a National Phase Entry of PCT International Application No. PCT/GB2019/050963, which was filed on Apr. 4, 2019, and which claims priority to Application No. 1805669.7 filed in Great Britain on Apr. 5, 2018, the contents of which are hereby incorporated by reference.

This invention relates to a conveyor system for use with an apparatus for the radiological examination of objects and to a method of conveying objects to and through such an apparatus. The invention finds particular application for use with an apparatus for the radiological examination of contained materials such as liquids and the like, especially within containers such as bottles and to a method of conveying contained materials such as liquids and the like, especially within containers such as bottles, to and through such an apparatus. The invention is discussed by way of example in respect of such particular application but is not limited to that use. In a more complete embodiment the invention relates to an apparatus for the radiological examination of objects such as containers of contained materials and method for the radiological examination of objects such as containers of contained materials such as liquids and the like.

The invention in particular relates to objects comprising containers of contained materials which by their nature will be expected to have a single generally homogeneous composition, for example fluid compositions such as liquids, including mixtures, solutions, emulsions, suspensions etc, like flowable compositions such as gels, pastes, creams, fine powders, and the like, aerosols etc. Where reference is made herein by example to contained liquids in liquid containers such as bottles it should be appreciated that the invention is equally applicable to all such liquid, partly-liquid and other flowable materials having this essential mixed and generally homogeneous character when contained.

The apparatus and method is in particular a radiological scanner for the determination of information relating to the composition of the contained material. The invention particularly relates to an apparatus and method making use of high energy radiation such as x-rays or gamma-rays to scan objects where it is desirable to gain information about the internal contents and/or composition of the contained material.

The principle of scanning objects with high energy radiation such as x-rays or gamma-rays, particularly to generate image information in the form of a transmission radiograph, is widely employed for example in the security industry, but might also be employed in other areas, for example, without limitation, medical imaging, imaging for quality control purposes or the purposes of determining the integrity of the structure, or the like.

For example X-rays are often used to inspect objects and the contents of containers, including bags, cases and bottles. In aviation security, dual view X-ray systems are generally used to screen carry on baggage and belongings. These techniques allow large bags to be placed directly onto a conveyor belt, but smaller belongings, including electronic items, small bags and divested items, bottles and the like are placed in a tray to prevent the items moving on the conveyor. There is value in ensuring that such small objects are held stably at a constant position passing through the scanner.

The present invention is particularly useful in relation to use in a security or like situation for the detection of contraband liquid materials, for example explosives or other dangerous or prohibited materials. There are a number of instances where the liquid contents of containers (bottles, jars, tins etc) are required to be examined without opening the bottle. These include security checks for explosives, customs checks for contraband, fraud capture and quality control. A particularly significant example of such used is in the screening of containers of unknown contents in an airport/airline or other enhanced security context or a customs control. The invention is discussed below by way of example in such a context. However the invention is not limited to security applications but can be applied in all circumstances where it might be desirable to gain information about the internal contents and/or composition of a contained liquid or liquid sample, for example for identification purposes, for stock control or quality control purposes, to monitor changes and especially degradation over time, and other applications.

It is desirable to scan the contents of objects such as, for example bottles, at security and customs checkpoints to gain information about content based on radiation received at a detector after interaction with the object and obtain an indication that the contents of the object do not constitute a threat to security or a breach of customs regulations. It is also desirable to scan the contents of objects for other purposes such as quality control, content verification, degradation monitoring etc.

To ensure that an object, a container or their contents are what they are claimed to be, it may be useful to scan the object and any contents so that a high energy and for example ionising radiation beam traverses a cross section of the object. Systems which convey objects through a scanner for example on a belt conveyor to generate an image are widely used for such purposes and existing protocols are in place for such systems.

However it can be possible to obtain an indication of the materials composition from a numerical analysis of the resultant transmitted radiation beam intensity data, for example by comparing the results of that analysis with a reference dataset relating to materials of known composition and/or to known contraband or other target materials.

The transmission of x-rays through a material can be given by the exponential attenuation law, as follows:

$$I/I_o = \exp[-(\mu/\rho)\rho t] \qquad (1)$$

where
 $\mu/\rho$=Mass attenuation coefficient (a material property which is characteristic of the weighted elemental composition of a material and the energy at which it is scanned);
 I=final intensity;
 $I_o$=Initial intensity;
 $\rho$=density of the material; and
 t=thickness of the material.

Thus by looking at the variation in the x-ray transmission as a function of changes in the thickness "t" of a material, for example, deductions can be made about the mass attenuation coefficient and the density of the material. These two parameters are characteristic of different materials and so materials identification becomes possible.

In particular, instrumentation has been developed which is intended to non-invasively identify target liquids and like materials (that is, materials having similarly generally homogenous composition throughout) held within sealed containers. The target liquids or like materials may be liquids or like materials which pose a security threat if carried on-board an aircraft, liquids containing dissolved narcotics, or liquids requiring quality control, for example.

When the object being scanned is a contained material which by its nature will be expected to have a single generally homogeneous composition, for example being a fluid composition such as a liquid as above described in a container, the analysis problem is potentially simplified when compared with scanning of inhomogeneous objects or packaging containing multiple objects by the expected homogeneity of the contained material and the container itself. Even so both the contained material and the container itself are subject to individual component variables, such as: the type of contained material, the composition or concentration of a contained material, the path length of high energy ionising radiation in the contained material, the material from which the container is made, and the thickness of the wall of the container, for example.

To enable these to be resolved when the radiation data collected from transmission through the container and its liquid or like contents is processed, and in particular to minimize complications attributable to fill level of partly filled bottles, irregular bottle shape and the like, known systems embodying the principles above described have been developed in which a bottle is scanned by being held in a fixed position and a scan performed through bottle and contents in a controlled manner using for example a simple pencil beam.

The fixed relationship and the simple beam geometry reduce unnecessary variable complexity in the transmission data and simplify its processing to resolve compositionally useful information about the contents. However the individual and discrete nature of the scanning operation reduces throughput as each bottle or other container must be placed in turn in the scanner.

The applicant has developed a technology to interrogate the liquid contents of a container and determine if the contents are threats to aviation security which exploits some of these features and is described in European Patent Application No 14796539.6, published as EP 3063533A. This technique requires the bottle to be held on the belt in a fixed position, so the data collected from both X-ray views is consistent. More generally, classification of threat and benign items is found to be improved if the items are placed with as minimum of tilt as possible out of the horizontal plane, in a tilt direction perpendicular to the direction of travel.

Conventional security scanners are known which use x-rays and the like to scan objects as they pass through a scanning zone on a conveyor such as a moving belt conveyor. Such apparatus are standard in airport and other security and customs control situations. However, the loss of control of orientation means they are unsuitable for some methods of analysis of objects, whether contained materials such as liquids in bottles or other small objects, as the above problems arise.

A partial solution to this is suggested in European Patent Application No 15721798.5, published as EP3137883A. This proposes the use of a gas-filled envelope so configured as to define a container receiving recessed portion into which the container sits so as to align successive containers consistently in an x direction relative to the direction of travel of the conveyor. This solution is not effective in aligning successive containers consistently to the horizontal. Classification of threat and benign items is found to be improved if the items are placed with as minimum of tilt as possible out of the horizontal plane, perpendicular to the direction of travel. It is therefore desirable to develop a solution that seats containers more effectively in a consistent orientation to the horizontal as they are passed successively along such a conveyor.

In accordance with the invention in a first aspect, a conveyor system for use with a scanning apparatus for the scanning of objects, including but not limited to contained materials such as liquids and the like, especially within containers such as bottles, comprises:

a transverse conveyor having a conveyor surface;
a plurality of object support modules each adapted to seat on the conveyor surface;
each object support module comprising a lower surface that sits upon the conveyor surface of the conveyor and an upper part in which an object receiving recessed portion is defined, wherein the object receiving recessed portion defines an elongate recess having a constant transverse profile.

Each object support module has a recessed portion that provides a generally concave recess into which an object such as a container or other small separately scanned object may be receiving seated in use, so as to be supported stably on the transverse conveyor. The recessed portion extends in an elongate direction, the elongate direction being such as in use to correspond to a direction of travel of the conveyor.

This direction of travel of the conveyor is referred to herein in non-limiting manner with reference to the intended use as the x direction, with a z direction being defined relative thereto in a horizontal plane in use, and a y direction being a direction perpendicular to the in-use horizontal plane. The elongate recessed portion, extending in an elongate x direction, tends to align successive objects consistently in an x direction relative to the direction of travel of the conveyor. In particular, given that most bottles and like containers have a defined elongate direction, typically being a longitudinal axis, the elongate recessed portion, extending in an elongate x direction, tends to align such successive bottles or like containers consistently with their elongate directions and for example their longitudinal axes in an x direction as the object support modules are passed successively along such a conveyor.

However, the recessed portion of an object support module in accordance with the invention is further characterised by the limitation that the elongate recess has a constant transverse profile, which is to say that the cross-sectional profile of the recess in a plane parallel to the plane of the conveyor surface, being for most practical purposes the horizontal plane in use, does not change as the recess extends along the object support module in the elongate direction corresponding to the x direction in use. It is the provision of this constant profile along the elongate direction that means that the object support modules tend to align successive objects received therein with their elongate directions and for example longitudinal axes in a plane parallel to the plane of the conveyor. This minimizes tilt in the y direction and ensures a more consistent orientation to the conveyor and in typical use to the horizontal for each of a succession of objects received in a succession of object support modules in accordance with the invention as the object support modules are passed successively along such a conveyor.

It may be particularly desirable to minimize the tilt from the horizontal The object support module in accordance with the invention is particularly effective in this regard.

The invention is applied to the support for passing through a scanner of objects to be scanned individually and for example containers of contained materials such as liquids and the like, especially within containers such as bottles. Where further discussion herein considers containers of contained materials such as liquids in bottles it will be appreciate that this is by way of exemplification. Many of the principles of the invention can be expected to apply to all contained materials comprising liquid, partly-liquid and other flowable materials having an essential mixed and generally homogeneous character when contained and to all other objects where a minimizing of tilt relative to the horizontal plane might be desired.

In use, an object such as a bottle or like container is placed on the support module and received in the recess in the support module, the support module is seated on the conveyor surface, and the object such as a bottle or other container is therefore stably held in a fixed position and orientation relative to the conveyor surface both relative to the direction of travel and relative to the horizontal. In use the conveyor then acts to convey the object and support module to and through a suitable scanning apparatus in familiar manner.

The invention confers advantages over prior art security scanning systems in which bottles or other scanned objects are held stationary and scanned one by one in that it is compatible with established continuous moving conveyor systems and scanning protocols and offers higher throughput rates.

It overcomes a particular problem that might arise in using standard moving conveyor systems or scanning protocols, for example by placing an object on the belt directly or in a tray such as it often provided for scanning of loose objects. A particular problem in modifying moving conveyor systems for the conveyance of bottles and like containers, particularly those with a conventional circular cross-section and a tendency to roll, is the necessity of retaining the object in a stable and fixed relationship both relative to the direction of travel and relative to the horizontal, so that its position is known as it passes through the scanning zone, so that its orientation is known, and so that in the case of contained materials the contents are not disturbed, and so that consistent results are obtained relative to reference data.

The invention achieves this by providing a recess in the upper surface of the object support module having a constant transverse profile, such that in use with the support module seated on the conveyor surface, the object, such as a bottle or other container, is therefore stably held in a fixed position and orientation and in particular is stably held in a fixed position and orientation relative to the horizontal.

Classification of threat and benign items is found to be improved if the items are placed with as minimum of tilt as possible out of the horizontal plane, in a direction perpendicular to the direction of travel. Accordingly, in a preferred embodiment, the lower surface of each object support module and the object receiving recessed portion are together configured such that an object received in the object receiving recessed portion is held in a parallel orientation to the plane of the conveyor surface. For example, the recessed portion of constant profile extends parallel to the lower surface, such that when the lower surface sits horizontally on the belt, the recessed portion extends similarly in a horizontal orientation.

The recessed portion comprises an elongate groove of constant profile to define a concave holding recess. Suitable profiles may depend on the objects to be received. Preferably, the constant profile has mirror symmetry about a mirror plane extending in the elongate direction. In one embodiment, the constant profile is a continuous curve, for example an arcuate portion of a circle, ellipse or parabola. In another embodiment, the constant profile is a stepped profile.

The profile may be suitable moulded into or machined out of the material of the upper part of the support module.

The support module requires sufficient rigidity to hold the object in such a stable and fixed position and orientation relative to the conveyor surface once the object is in place, but it may still be desirable to provide a degree of resilience, especially with regard to the recess in the upper surface of the support module. In a possible embodiment therefore, at least the portion of the support module comprising the recess in the upper surface is resiliently deformable and for example comprises flexibly resilient material. For example, the recess in the upper surface is configured in use to be resiliently deformable as an object is placed therein, into a deformed configuration where the object is held stably and rigidly in a fixed position and orientation. This might allow a single recessed unit to accommodate a range of objects including multiple bottle or other container shapes/sizes, and/or to provide a degree of cushioning of the contents.

The support module comprises a lower surface that sits upon the conveyor surface. The lower surface is preferably adapted to tend to retain the support module in a stable seated position on the conveyor surface as the conveyor is caused to move. For example the lower surface comprises or has a surface covering of a high friction material. Additionally or alternatively, the support module may comprise one or more engagement members to engage a lower surface of the support module in a seated position on the conveyor surface.

A support module in accordance with the invention may comprise a single formation designed to seat directly on the conveyor surface, with a lower surface that sits upon the conveyor surface of the conveyor and an upper part in which a container receiving recessed portion is defined.

Alternatively, the support module in accordance with the invention may comprise a modular formation, for example comprising a holder such a tray and a support formation configured to be carried by the holder and for example as an insert for the tray. In such a case a lower surface of the holder defines the lower surface of the support module that sits upon the conveyor surface of the conveyor and an upper surface of the support formation defines the upper part of the object support module in which an object-receiving recessed portion is defined.

Desirably, the support module should have a known x-ray attenuation profile, and more desirably yet a negligible x-ray attenuation profile. This allows any x-ray attenuation attributable to the support module to be easily subtracted from a signal produced during a scan in use, or to be ignored, as the case may be. A support module with a very low x-ray attenuation provides for more widespread applicability for a range of applications, in particular for example where it is desirable to scan a range of object with a range of potential responses, and the complication of removing attenuation attributable to the object might make the data harder to interpret.

Desirably, the support module, or at least the support formation of a modular support module, may be fabricated from a light weight/low density material.

Materials meeting some or all of these requirements might include open and closed cell cellular materials such as cellular polymeric materials, for example including polymerised styrene, vinyl and imide foams.

Support modules or formations in accordance with the invention have further advantages, for example being easily fabricated, low cost and disposable, and can be easily marked with identifying markers, for example to indicate suitable container sizes, for positional sensing or calibration requirements. Established fabrication techniques are available.

It is particularly desirable feature that a conveyor system in accordance with the invention is configured to ensure that the position of any object such as a bottle or other container is aligned in a known direction, which is preferably the direction of translation of the transverse conveyor, and in a known orientation to the horizontal.

This is achieved by provision of an elongate recess or grove that extends for a suitable length to hold the desired object or range of objects, with constant profile over that length. This does not exclude the provision of other profile features which may operate co-operably with this elongate recess or grove of constant profile to give additional functionality. Such other profile features may for example be integrally incorporated into the support module or insertable support formation or provided as secondary inserts therefor.

For example, for some applications it may be desired to restrict the position along the length of the support module that the items being held are placed, such as preventing the items being placed at the end of the recess or groove or at certain points along the recess or groove to prevent items touching each other. Embodiments to prevent this include changing the shape of the recess or groove along its length, including through inserts, areas where the recess or groove is not present (eg is not cut if the groove is machined out of blocks of material) or through other changes to the groove shape at certain points.

An embodiment in line with previous embodiments may be one which inserts one or more pieces of an alternative material into the material used to make the item-holding material of a support module or formation. This material could include more dense foams, plastics, metals or other materials with different properties to the material used in the support module or formation to hold the items.

One embodiment uses such an alternative material to allow the inspection system to recognise that the item being scanned is one which has been placed on the item-holding material. For example, this may be to inform the X-ray scanning system that there is a bottle of liquid to be scanned, and a separate protocol should be used (e.g. different scanning parameters and/or a different method of analysis of the resulting information). The alternative insert material should have different properties to the main material of the support module or formation.

For example, metal inserts which absorb X-rays in a different manner to the original material of the support module or formation can be used to inform the system a bottle-holding tray is being used. In another example is a RFID tag may be inserted into the material of the support module or formation to inform the sensor that a bottle tray is being used. Embodiments of these methods can use an insert identical in each tray or other holder simply to inform the system a particular type of tray or other holder is being used, or can be specific to each and every tray or other holder to allow tracking of individual items through the system and potentially other measurement techniques. Embodiments can include specifically coded pieces of insert which can be uniquely identified by an X-ray system, or individually coded RFID tags. An alternative embodiment places the coded inserts about the tray or other holder to which a support formation of a modular support module fits, rather than in the material of the support module or formation itself.

Another use of an insert of an alternative material is to provide more strength to the main holding material. For example, in the embodiment where the holding material is a foam insert inside trays, it may be preferable for the end-user to stack multiple trays together, and the weight of multiple trays and inserts may deform the foam on the lower trays. Inserting a stronger material into the holding material can increase the strength of the system and prevent deformation.

This can be an alternative use of the insert material to the identification purpose, a dual-use of the insert to provide both strength and identification, or as one of two or more inserts, with at least one for providing strength and at least one other for providing identification.

The conveyor system includes a transverse conveyor having a conveyor surface to receive plural support modules, and in a possible embodiment having plural support modules fixedly mounted thereupon. The transverse conveyor is operable to translate the conveyor surface and support modules thereon (in use carrying objects to be scanned such as containers of contained material) in a transverse translational direction to and through a scanning zone defined in a suitable scanner. Suitable drive means may be provided to effect this for example being adapted to cause movement of the conveyor surface in a transverse translational direction.

The transverse conveyor may comprise an endless conveyor element. The transverse conveyor may comprise a belt, chain or the like, an upper surface of which then constitutes the conveyor surface. The transverse conveyor is conveniently an endless belt conveyor.

A system in accordance with the invention preferably comprises a plurality of support modules. A suitable plurality of support modules may include plural alternative sizes and/or structures adapted for use with multiple object sizes, shapes etc to give the system versatility to deal with different objects.

In use, a plurality of support modules may be distributed across the conveyor surface, for example in one or more rows arranged in a translation direction. In the case where support modules are fixedly attached to the conveyor surface, a plurality of support modules may be fixedly attached in distributed manner across the conveyor surface, for example in one or more rows arranged in a translation direction. Where plural rows are provided, the modules in any given row are preferably longitudinally offset in a transverse direction relative to other modules in any further rows, so that objects therein pass successively but separately through the scanning zone.

In a second more complete aspect of the invention, a scanning system is provided comprising a conveyor system in accordance with the first aspect of the invention in combination with a suitable object scanner.

The conveyor system is positioned to convey objects under test, for example comprising bottles or like containers of liquids or other materials having the same general homogenous characteristics, which are placed upon a conveyor surface, supported by suitable support modules as above described, and translated to and through the object scanner.

The object scanner is in a typical case a radiological scanner typically operating at a plurality of energies and/or over an energy range, and is for example a scanner that makes use of high-energy radiation such as ionizing radiation, for example high energy electromagnetic radiation such as x-rays and/or gamma rays, or subatomic particle radiation.

The scanner for example comprises a radiation source and a radiation detector system spaced therefrom to define a scanning zone therebetween, the conveyor system being positioned to convey objects under test, for example comprising bottles or like containers of liquids or other materials having the same general homogenous characteristics, to and through the scanning zone.

The detector system is thus disposed to collect radiation after interaction with and for example in the preferred case after transmission through an object in the scanning zone in particular in an energy selective manner at a plurality of energies and/or over an energy range.

The detector system is in particular adapted to collect radiological information indicative of the material composition of an object in the scanning zone and the scanner is therefore an apparatus for the collection of radiological information indicative of the material composition of an object in the scanning zone. In particular preferably the scanner is adapted for the collection of compositional information from and for example identification of contained materials such as liquids and the like within containers.

Preferably the detector system is adapted to resolve radiation incident upon it spectroscopically into a plurality of energy bands. In an embodiment the detector system is dual energy and is adapted to resolve radiation incident upon it spectroscopically into two energy bands. In another embodiment the detector system is multispectral and is adapted to resolve radiation incident upon it spectroscopically into at least three energy bands.

The detector system is thus compatible with existing numerical analysis techniques to determine compositional information from spectroscopically resolved transmitted radiation and/or from spectroscopically resolved attenuation data.

However, throughput rates may be increased. Multiple items may be scanned, if not simultaneously a least immediately successively, as they are caused to pass through the scanning zone on a movable conveyor. The scanning system more closely parallels existing scanning protocols for security purposes than does a static prior art system.

The radiation source is preferably adapted to generate a two dimensional beam such as a fan beam or a curtain beam to obtain a slice transversely through an object as it passes through the scanner.

The detector system is preferably arranged and configured to receive incident radiation from such a two dimensional beam after transmission through the object and is preferably a linear array detector or a series of such linear array detectors.

The detector system is in particular preferably adapted to generate a transverse slice dataset from radiation transmitted as a transverse slice through an object as it passes through the scanner and includes transverse slice dataset generation module for this purpose. Optionally additionally the detector system may include a transverse slice dataset processing module to further process the data from the transverse slice dataset numerically to derive information pertinent to the composition of the contained material and/or to present the information as a viewable image. Optionally, the detector system further includes an image generation apparatus to generate at least a first image from the output of the detector system; and optionally further an image display adapted to display an image.

The radiation source is for example a source of high-energy radiation such as ionizing radiation, for example high energy electromagnetic radiation such as x-rays and/or gamma rays, or subatomic particle radiation, and the detector is adapted correspondingly to detect radiation in this spectrum. The radiation source for example is a broadband source such as a broadband x-ray or gamma-ray source capable of producing broad spectrum emission over a wide range of energies.

The detector system preferably exhibits a spectroscopically variable response across at least a part of the source spectrum allowing spectroscopic information to be retrieved and allowing intensity information to be detected at a plurality of differentiated energy bands. For example the detector system is a dual energy system. In such a case the detector system preferably includes a data collection module to collect a dataset of intensity information about radiation incident at the detector resoled across said plurality of differentiated energy bands and a dataset processing module to further process the data from the dataset of intensity information numerically to derive information pertinent to the composition of the contained material and/or to present the information as a viewable image.

The detector system is preferably adapted to detect incident radiation in spectroscopically resolved manner in plural separate energy bands in the sense that it is adapted to differentiate incident radiation simultaneously into plural separate energy bands and for example two such energy bands across the expected detection spectrum. For example, the detector system exhibits a spectroscopically variable response across at least a part of the expected detection spectrum allowing such simultaneous differentiation of incident radiation into a plurality of differentiated energy bands. Preferably incident radiation data is resolved spectroscopically between at least three energy bands simultaneously.

A suitable detector for implementation of the invention comprises one or more detector elements of a semiconductor material adapted for high energy physics applications, such as a material able to act as a detector for high energy radiation, and for example high energy electromagnetic radiation such as x-rays or gamma rays, or subatomic particle radiation. The resultant detector element comprises at least one layer of such material and is thus a device adapted for high energy physics applications, and for example a detector for high energy radiation such as x-rays or gamma rays, or subatomic particle radiation.

In accordance with the preferred embodiment, collected data is resolved spectroscopically across at least two and optionally at least three and for example many energy bands within the spectrum of the source. The semiconductor material of at least one of the detector elements is preferably a material adapted to exhibit a spectroscopically variable response across at least a substantial part of the intended radiation spectrum in use. In particular a semiconductor material is used that exhibits inherently as a direct material property a direct variable electrical and for example photo-electric response to different parts of the radiation spectrum in use.

In a further aspect of the invention, there is provided a method of scanning and object and more preferably plural successive objects comprising the use of the foregoing apparatus by conveying objects to and through such a scanner. The method is in particular applied to contained materials such as liquids and the like, especially within containers such as bottles and comprises conveying contained materials such as liquids and the like, especially within containers such as bottles, to and through such a scanner.

The method comprises:
providing a transverse conveyor having a conveyor surface;
providing a plurality of object support modules each adapted to seat on the conveyor surface, wherein each object support module comprises a lower surface that sits upon the conveyor surface of the conveyor and an upper part in which an object-receiving recessed portion is defined, wherein the object receiving recessed portion defines an elongate recess having a constant transverse profile;

disposing at least one object support module on the conveyor surface, and more preferably disposing plural object support modules on the conveyor surface;

placing at least one object on an object support module and more preferably disposing plural objects each on a support module;

translating the transverse conveyor to cause the at least one object and object support module to move to and through a scanner.

The method is thus a method of use of the conveyor system of the first aspect of the invention or the scanning system of the second aspect of the invention and preferred features will be understood by analogy.

In the preferred case in particular the step of causing the at least one object and object support module to move to and through a scanner comprises specifically:

providing a radiation source and a radiation detector system spaced therefrom to define a scanning zone therebetween;

translating the transverse conveyor to cause the at least one object and object support module to move through the scanning zone;

collecting radiation incident at the detector after interaction with and for example transmission through the at least one object in the scanning zone.

In the preferred case in particular the method is deployed as a method of collection of radiological information indicative of the material composition of the contents of the at least one object in the scanning zone and the scanner is preferably an apparatus adapted for the collection of compositional information from and for example identification of objects and for example contained materials such as liquids and the like within containers and the method includes the further step of deriving information indicative of the material composition of the contents of the at least one object and for example container from the collected radiation incident at the detector after interaction with and for example transmission through the at least one object and for example container in the scanning zone.

In the preferred case in particular the method makes use of spectroscopically resolved radiation incident at the detector to derive information indicative of the material composition of the object and for example contents of the at least one container, and includes the step of resolving the radiation spectroscopically into a plurality of energy bands and for example dual energy bands spaced across a spectrum of the source radiation.

The invention will now be described by way of example only with reference to an example application to the scanning of bottles and to FIGS. 1 to 9 of the accompanying drawings in which.

Figure 1:
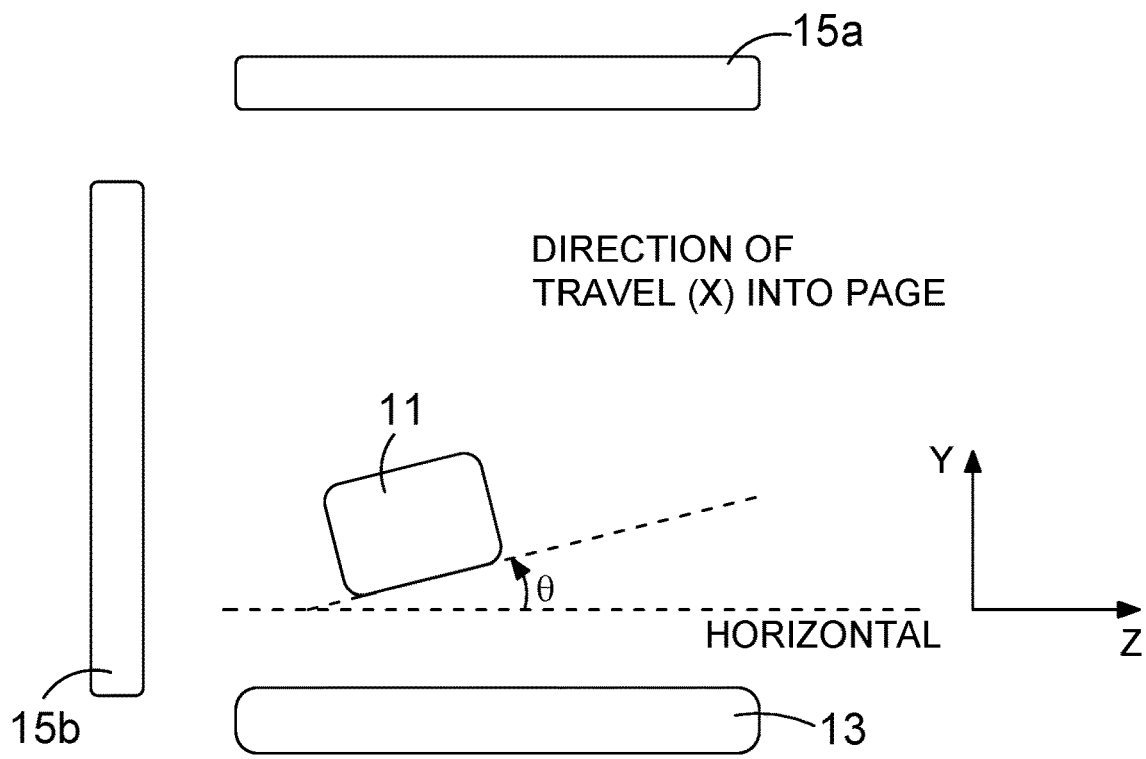
FIG. 1 shows a bottle in a tilted orientation that it is particularly desired to control/minimize as discussed above.

FIG. 1 provides a simple schematic representation of the conveyance of a bottle or like container through a scanning system to illustrate the tilted orientation that it is particularly desired to control/minimize as discussed above.

A bottle 11 is carried on a conveyor 13 through a scanning zone defined by a pair of orthogonal detector arrays 15a, 15b. The direction of travel of the conveyor, referred to herein as the x direction, is into the page, with a z direction being defined relative thereto as a horizontal direction, and a y direction being a vertical direction. Most bottles and like containers have a defined elongate direction, typically being a bottle axis, and any holder (omitted in FIG. 1 for clarity), extending in an elongate x direction, tends to align successive bottles consistently with their elongate axis in an x direction.

It may be particularly desirable to control and especially to minimize the tilt from the horizontal, shown as the angle $\theta$ in FIG. 1.

Figure 2:
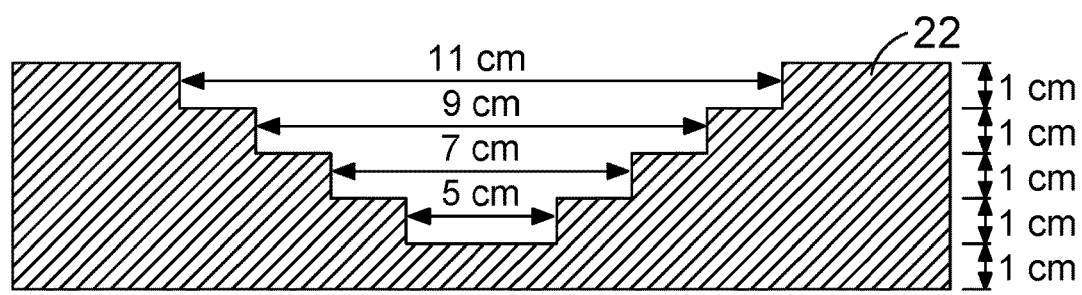
FIGS. 2 to 4 show in cross-section three alternative structures with stepped grooves which may be used directly as supports on the conveyor or be placed in a tray to constitute a support module embodying the principles of the invention.
Figure 3:
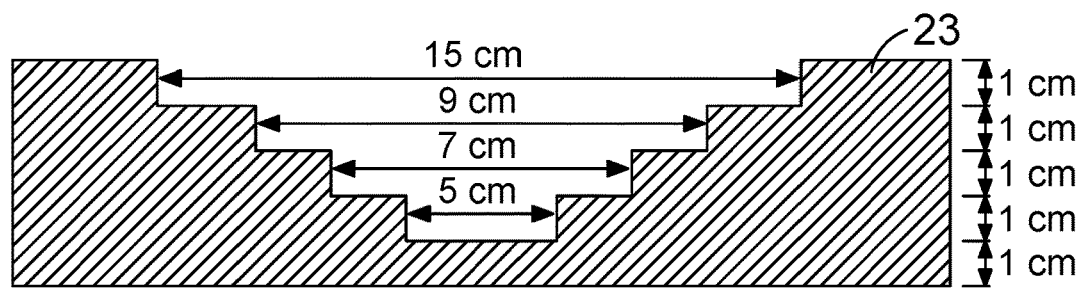
Figure 4:
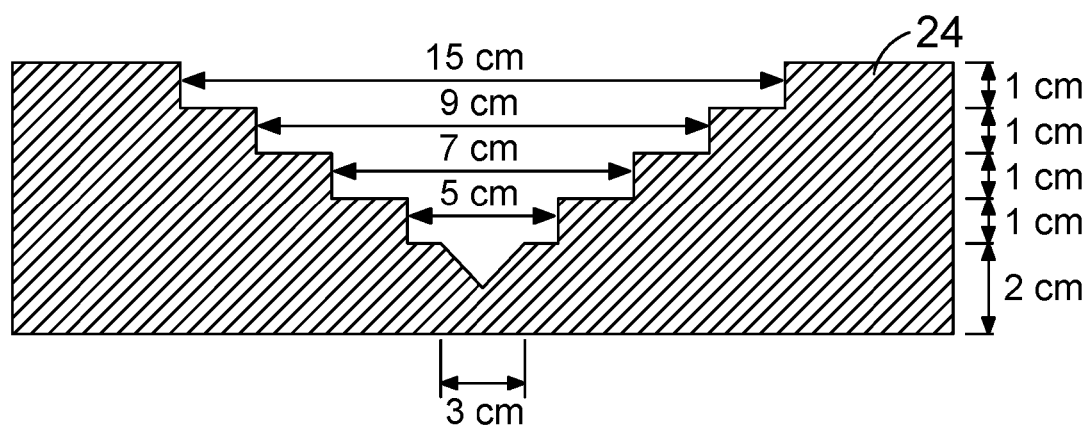

FIGS. 2 to 4 show in cross-section three alternative structures with stepped grooves which may be used directly as supports on the conveyor or be placed in a tray to constitute a support module embodying the principles of the invention and to tend to control/minimize any tilt angle. These are particularly suited to the scanning of bottles, and are discussed in that context, but the invention is not limited to the scanning of bottles but is applicable to any scenario where maintenance of a horizontal attitude is desirable.

Each shows a profiled form of a support formation of a material which has negligible or uniform impact on the investigative method. In the case of x-rays, materials for this include foam or airbags. In turn, this material may be placed directly upon the conveyor or other method or insertion into the inspection system, or the material may be held by another means, such as a plastic tray.

The support only consists of light materials that do not significantly modify the intensity or the spectrum of a polychromatic x-ray beam with may be used to irradiate a bottle carried upon it.

This is importance potentially significant advantage in the intended principal application of the invention where the modification to such a transmitted x-ray spectrum by attenuation through bottle and contents is used as the basis for materials identification. Using such a support means that the interpretation of the material contents of a scanned bottle is not affected by the supporting structure.

A support structure with a very low x-ray attenuation provides for more widespread applicability for a range of applications, in particular for example where it is desirable to scan a range of containers with a range of potential responses, and the complication of removing attenuation attributable to the container makes the data harder to interpret.

A support formation 22 with a simple regular stepped groove along the length of the material is shown in FIG. 2 with example dimensions for the step widths and depths.

Another embodiment varies the width of the steps to match the spread of dimensions of expected items. This is shown by the support formation 23 in FIG. 3 with example dimensions for the step widths and depths.

Another embodiment utilises a groove in the smallest slot to ensure small not-flat-sided items are held and do not roll around. This groove can be triangular, circular or and curved shape. This is shown by the support formation 24 in FIG. 4, with a triangular example and with example dimensions of variable step widths and regular step depths.

Figure 5:
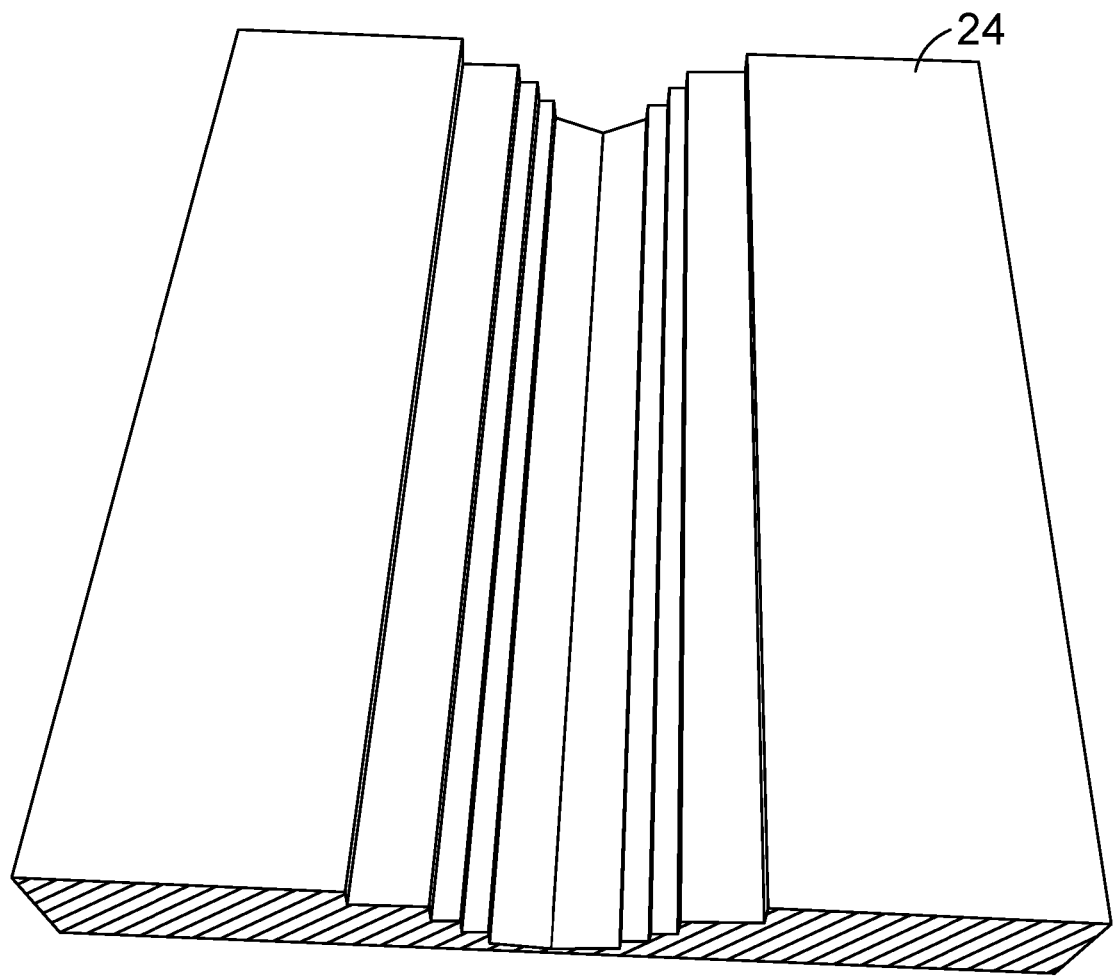
FIG. 5 is a perspective view of the insert of FIG. 4.

FIG. 5 shows a perspective view of the formation 24 of FIG. 4.

Figure 6:
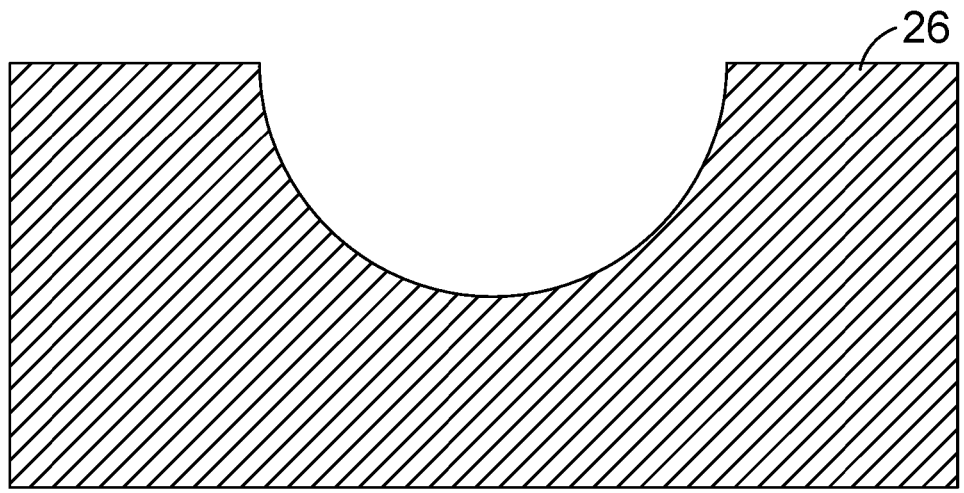
FIGS. 6 and 7 show in cross-section two alternative inserts with curved grooves to be placed in a tray to constitute a support module embodying the principles of the invention.

FIG. 6 shows an alternative embodiment of support formation 26 in cross-section with a single semi-circular groove to hold the item in position.

An alternative embodiment of support formation 27 uses a parabolic (FIG. 7) or any other curved shape to hold the item in position.

These and other such support formations may be placed directly upon or fixed to and from a part of the conveyor. Alternatively, the support formations may be held by another means, such as a tray or other holding, which is then placed upon or fixed to the conveyor.

Figure 7:
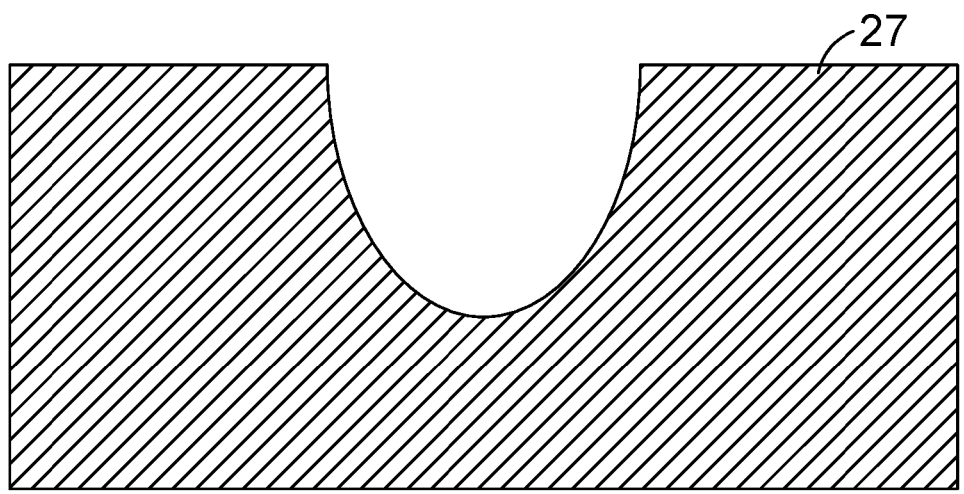
Figure 8:
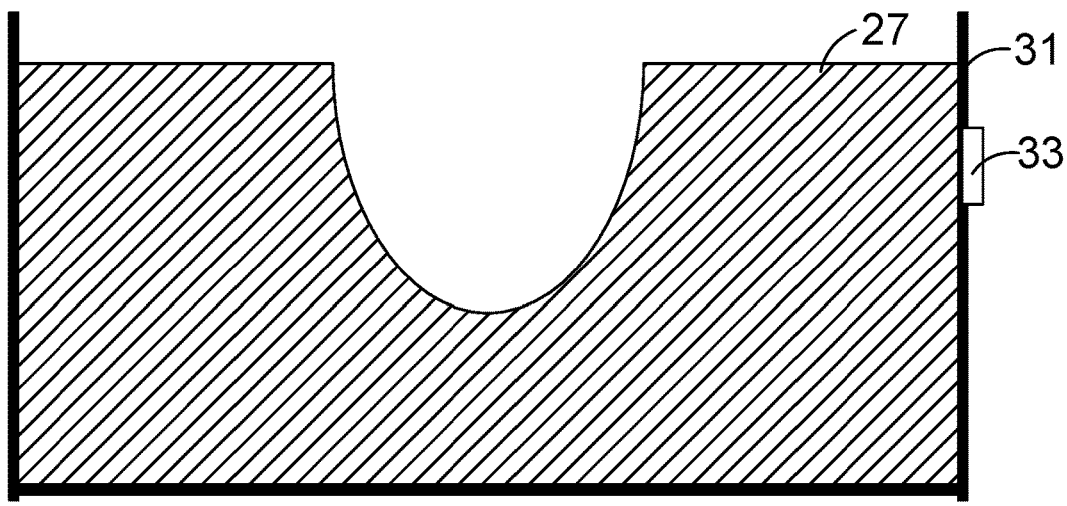
FIG. 8 shows the insert of FIG. 7 in such a tray.

An example is shown in FIG. 8, in which the support formation 27 of FIG. 7 is retained in a simple tray 31 of rigid plastics material. A simple homogeneous tray may be used.

However, in the illustrated embodiment the tray 31 is provided with additional functionality by means of the tag 33 mounted on the surface (and which way in the alternative be embedded into the material of the tray or of the support formation). The tag or insert is selected to be separately detectable, either by its response to the scanner or to some other reader. For example, the tag or insert may be of an alternative material with different properties to the main material of the tray or support formation. In another example an RFID tag may be attached to or inserted into the material of the tray or support formation. Embodiments can use an insert identical in each tray or support formation, or can be specific to each tray or other support formation to allow tracking of individual items through the system.

Figure 9:
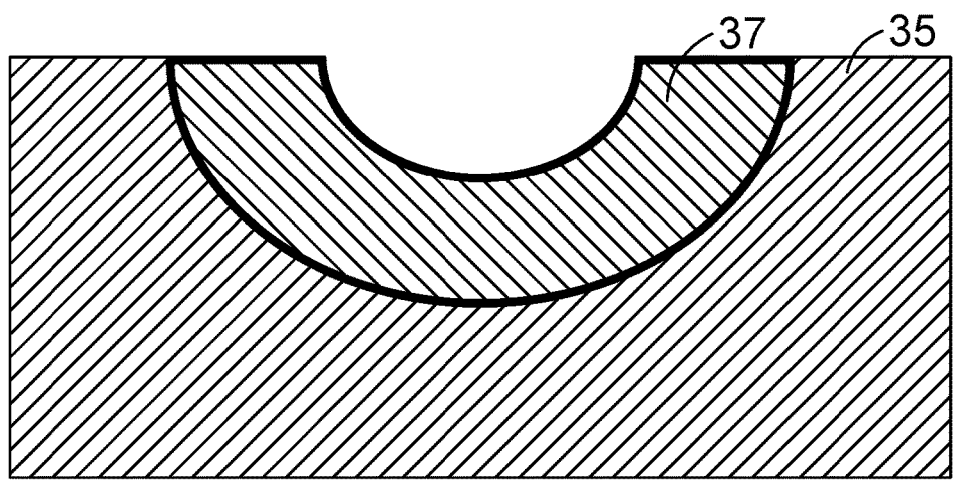
FIG. 9 shows a further alternative insert.

An alternative composite embodiment of support formation shown in FIG. 9 comprises a body portion 35 that makes up most of the support and a recess forming portion that defines the recess into which a container is received in use. This may allow different material properties to be selected, for example so that the recess forming portion 37 provides a greater degree of flexible resilience so as in use to be resiliently deformable as an object is placed therein, with the body portion 35 being more rigid. In this embodiment the composite support formation is additionally carried in a tray 31.

Embodiments detailed above display flat sides perpendicular to the base. Alternatives to these embodiments can have non-flat surfaces to allow the material to conform to a tray or other holding mechanism having another shape.

The supporting structures described above are compliant with use in a belt fed scanner system such as will be familiar.

In an example use, multiple supporting tray/insert combinations, supporting multiple bottles, are provided arrayed on an upper surface of a conveyor belt which transports the supported bottles in a belt direction. The supporting structures allow for the orientation of the bottle, in particular to the horizontal and also aligned to the direction of belt travel, to be simply achieved by an operator.

The support structures may be incorporated in a fixed pattern onto a belt of a scanner system, so that the bottles lie in a row or in multiple rows in a staggered array so that they can be closely successively but separately scanned as the belt moves. This allows high throughput rates while avoiding the problem which might arise in the event of the simultaneous scanning of multiple bottles.

For example to do this multiple trays may be located on the surface of the scanner. The lower surface of each tray may be provided with a high friction material for example. Bottle orientation may thus be aligned to the direction of translation allowing for the possibility for the lateral and horizontal positions of the bottle being stable and known.

Figure 10:
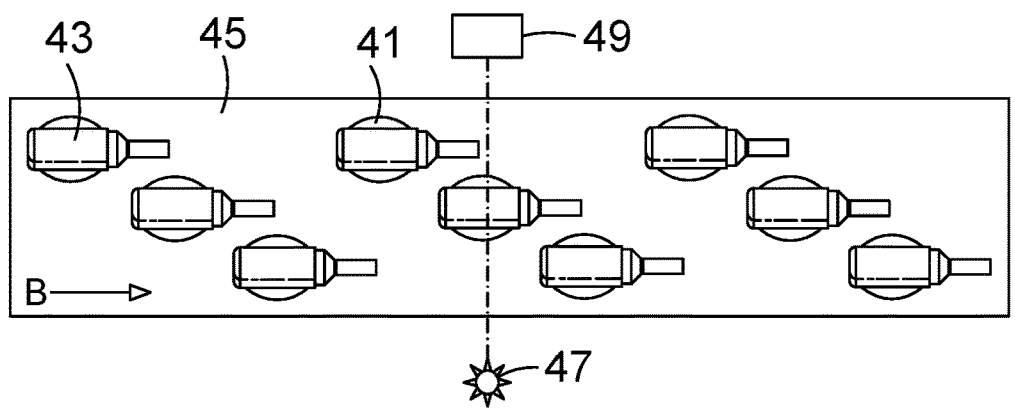
FIG. 10 shows in plan view a scanner including a conveyor carrying multiple support modules in accordance with the principles of the invention.

The principle is illustrated in FIG. 10.

Multiple supporting structures 41 shown in place on a conveyor belt 45 and supporting multiple bottles 43 are illustrated from above.

The supporting structures 41 are provided arrayed on an upper surface 45 of a conveyor belt which transports the supported bottles in a belt direction B. The supporting structures 41 align orientation of the bottle to the direction of belt travel and hold them horizontally.

The conveyor belt 45 moves the bottle and support arrangements in a traversing direction B towards and through a scanner. The scanner in the embodiment provides a scanning zone defined by a polychromatic x-ray source 47 and a multispectral x-ray detector 49 to make use of scan beams that are orthogonal, nominally recording x-ray projection data of slices through the target object and at a number of x-ray energies, facilitated by energy selective detection technology.

The resultant scanned slice through the target object is conveniently a one or two dimensional transmission radiograph. The collected data may be numerically analysed. For example, the scanner is adapted to use transmission intensity data to generate a one- or two-dimensional image of an object in an x, y plane generally perpendicular to an incident radiation transmission path and/or to process such transmission intensity data from a slice of an object in an x, y plane for example to obtain information about the material composition of container and/or contents.

Such a source and detector arrangement is in the preferred mode of operation used to obtain spectroscopically resolved attenuation information, resolved across at least two and preferably at least three energy bands of the polychromatic x-ray source as the polychromatic x-ray beam traverses bottle and contents, and this attenuation information may then be used as the basis for materials analysis/identification, for example by numerical processing embodying the principles of International Patent Publication No. WO2009/024818.

In the illustrated example, the support structures are arrayed in a fixed pattern on a belt of a scanner system, so that the bottles lie in three rows in a staggered array so that they can be closely successively but separately scanned as the belt moves in the direction B. This allows high throughput rates while avoiding the problem which might arise in the event of the simultaneous scanning of multiple bottles, and the difficulty in deciphering information from such multiple bottle scans, as the traversal by the x-ray beam of single bottle slices can be separately identified.

Thus, the system provides a versatile solution that has a minimal effect on the attenuation of the x-ray beam, allowing insertion of multiple bottle shapes and sizes, supporting bottles of a regular shape reliably, stably and consistently, and affording the opportunity for the operator to position the bottle as required and provide effective scanning.

The invention claimed is:

1. A conveyor system for use with a scanning apparatus for the scanning of objects comprising:
   a transverse conveyor having a conveyor surface;
   a plurality of object support modules, each object support module comprising a lower surface that sits upon the conveyor surface of the conveyor and an upper part in which an object receiving recessed portion is defined;
   wherein the object receiving recessed portion defines an elongate recess having a constant stepped transverse profile.

2. A conveyor system in accordance with claim 1 wherein each object support module has a recessed portion that provides a generally concave recess, wherein the recessed portion extends in an elongate direction, the elongate direction being such as in use to correspond to a direction of travel of the conveyor, and wherein the elongate recess has a constant transverse profile in that the cross-sectional profile of the recess in the horizontal plane does not change as the recess extends along the object support module in the elongate direction corresponding to an x direction in use, wherein the constant transverse profile along the elongate direction corresponds to the direction of travel of the conveyor.

3. A conveyor system in accordance with claim 1 wherein the object receiving recessed portions of the object support modules are respectively adapted to align successive objects received therein consistently in a direction corresponding to the direction of travel of the conveyor.

4. A conveyor system in accordance with claim 3 for use with objects having a defined longitudinal axis wherein the object receiving recessed portions of the object support modules are respectively adapted to align successive objects received therein with their longitudinal axes in a direction corresponding to the direction of travel of the conveyor.

5. A conveyor system in accordance with claim 1 wherein the object receiving recessed portions of the object support modules are respectively adapted to align successive objects received therein in a consistent orientation to the horizontal.

6. A conveyor system in accordance with claim 5 for use with objects having a defined longitudinal axis wherein the object receiving recessed portions of the object support modules are respectively adapted to align successive objects received therein with their longitudinal axes in a plane parallel to the plane of the conveyor.

7. A conveyor system in accordance with claim 1 wherein the conveyor is a horizontal conveyor and the object receiving recessed portions of the object support modules are respectively adapted to align successive objects received therein in a consistent attitude to the horizontal.

8. A conveyor system in accordance with claim 1 wherein the recessed portion comprises an elongate groove of constant profile that has mirror symmetry about a mirror plane extending in the elongate direction.

9. A conveyor system in accordance with claim 8 wherein the constant profile comprises a continuous curve.

10. A conveyor system in accordance with claim 1 wherein at least a portion of the support module comprising the recess in the upper surface is resiliently deformable.

11. A conveyor system in accordance with claim 10 wherein the recess in the upper surface is configured in use to be resiliently deformable as an object is placed therein, into a deformed configuration where the object is held stably and rigidly in a fixed position and orientation.

12. A conveyor system in accordance with claim 1 wherein the support module comprises a modular formation including a tray and a support formation configured to be carried as an insert for the tray.

13. A conveyor system in accordance with claim 1 wherein the support module comprises a material that exhibits a negligible x-ray attenuation profile.

14. A conveyor system in accordance with claim 1 wherein the conveyor surface is provided with plural support modules fixedly mounted thereupon in distributed manner across the conveyor surface in one or more rows arranged in a translation direction.

15. A scanning system in accordance with claim 1 wherein the scanner comprises a radiation source and a radiation detector system spaced therefrom to define a scanning zone therebetween, the conveyor system being positioned to convey objects under test to and through the scanning zone.

16. A scanning system in accordance with claim 15 wherein the radiation source is adapted to generate a two dimensional beam such as a fan beam or a curtain beam to obtain a slice transversely through an object as it passes through the scanning zone, and wherein the detector system is arranged and configured to receive incident radiation from a two dimensional beam after transmission through the object.

17. A method of scanning objects comprising:
providing a transverse conveyor having a conveyor surface;
providing a plurality of object support modules each adapted to seat on the conveyor surface, wherein each object support module comprises a lower surface that sits upon the conveyor surface of the conveyor and an upper part in which an object-receiving recessed portion is defined, wherein the object receiving recessed portion defines an elongate recess having a constant stepped transverse profile;
disposing at least one object support module on the conveyor surface;
placing at least one object on an object support module;
translating the transverse conveyor to cause the at least one object and object support module to move to and through a scanner.

18. The method of claim 17 wherein the step of causing the at least one object and object support module to move to and through a scanner comprises:
providing a radiation source and a radiation detector system spaced therefrom to define a scanning zone therebetween;
translating the transverse conveyor to cause the at least one object and object support module to move through the scanning zone;
collecting radiation incident at the detector after interaction with and for example transmission through the at least one object in the scanning zone.

19. The method of claim 18 wherein the collection of radiological information determines the material composition of the at least one object in the scanning zone.

* * * * *